US012739621B2

(12) United States Patent
Liu

(10) Patent No.: US 12,739,621 B2
(45) Date of Patent: Sep. 15, 2026

(54) MIDDLEWARE FRAMEWORK FOR TELCOMMUNICATIONS SERVICE MESSAGING

(71) Applicant: T-MOBILE INNOVATIONS LLC, Overland Park, KS (US)

(72) Inventor: James Chungyu Liu, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 337 days.

(21) Appl. No.: 18/415,865

(22) Filed: Jan. 18, 2024

(65) Prior Publication Data

US 2025/0240617 A1 Jul. 24, 2025

(51) Int. Cl.
*H04W 8/26* (2009.01)
*H04W 4/12* (2009.01)

(52) U.S. Cl.
CPC ............... *H04W 8/26* (2013.01); *H04W 4/12* (2013.01)

(58) Field of Classification Search
CPC ........... H04W 8/26; H04W 4/12; H04W 4/02; G06Q 50/167; G06Q 10/06314; G06Q 20/02; G06Q 20/3827; G06Q 50/16; G06Q 2220/00; G06Q 10/1093; G06Q 30/06; G06Q 50/18; G06F 16/137; G06F 16/1834; G06F 16/1837; G06F 16/2358; G06F 16/248; G06F 16/27; G06F 21/64; G06F 40/174; G06F 40/186; G06F 18/21; G06V 30/418; H04L 9/0637; H04L 9/0643; H04L 9/0825; H04L 9/3236; H04L 9/50
See application file for complete search history.

(56) References Cited

U.S. PATENT DOCUMENTS

| | | | | |
|---|---|---|---|---|
| 6,466,983 | B1 * | 10/2002 | Strazza | H04L 63/08 707/999.008 |
| 7,218,918 | B1 * | 5/2007 | Alston | G06Q 30/0251 455/226.1 |
| 12,501,232 | B1 * | 12/2025 | Chang | H04W 4/021 |
| 2002/0061003 | A1 * | 5/2002 | Sumner | H04L 63/08 370/338 |

(Continued)

FOREIGN PATENT DOCUMENTS

| | | | | |
|---|---|---|---|---|
| CN | 121744362 | A * | 3/2026 | |
| EA | 201600443 | A1 * | 12/2016 | H04W 8/26 |

(Continued)

*Primary Examiner* — Julio R Perez
(74) *Attorney, Agent, or Firm* — SHOOK, HARDY & BACON L.L.P.; Elena K. McFarland

(57) ABSTRACT

Aspects herein provide for generating customized messaging to deliver accurate composite allocations for available telecommunication services of a user device. In aspects, middleware intelligently determines composite allocations for data, voice, and/or roaming, for example, by executing a summation instruction that combines corresponding parameter thresholds for a base service and one or more supplemental services. A message can be customized with the composite allocation and communicated to the user device with an accurate indication of available data, voice, and/or roaming services that are available. Subsequent messages can be similarly customized and communicated that include updated allocations and/or alerts, in aspects.

20 Claims, 6 Drawing Sheets

(56) References Cited

U.S. PATENT DOCUMENTS

| | | | | |
|---|---|---|---|---|
| 2006/0239265 | A1* | 10/2006 | Son | H04L 12/189<br>370/432 |
| 2025/0240617 | A1* | 7/2025 | Liu | H04W 8/26 |
| 2026/0006432 | A1* | 1/2026 | Yu | H04W 4/08 |

FOREIGN PATENT DOCUMENTS

| | | | | |
|---|---|---|---|---|
| WO | WO-2012058800 | A1 * | 5/2012 | H04W 4/021 |
| WO | WO-2016057838 | A1 * | 4/2016 | H04W 4/029 |
| WO | WO-2026066614 | A1 * | 4/2026 | |

* cited by examiner

300

| **Message Types** |
| --- |
| On Network Data – 80% |
| On Network Data – 100% |
| On Network and Tethering – Notify |
| On Network and Tethering Overage – 80% |
| On Network and Tethering Overage – 100% |
| On Network and Tethering – 80% |
| On Network and Tethering – 100% |
| Data Domestic Roaming – 80% |
| Domestic Roaming – 100% |
| Preferred Domestic Roaming – 80% |
| Preferred Domestic Roaming – 100% |
| North America Non-US Roaming – 80% |
| North America Non-US Roaming – 100% |
| Simple Global Roaming – 80% (Limited Roam) |
| Simple Global Roaming – 100% (Limited Roam) |
| Complex Global Roaming – 80% (Limited Roam) |
| Complex Global Roaming – 100% (Limited Roam) |
| Data, Roam, Location – 80% (Limited Data, Roam, Location) |
| Data, Roam, Location – 100% (Limited Data, Roam, Location) |
| Global Data Pass – 80% |
| Global Data Pass – 100% |
| Other Usage Limit – 80% |
| Other Usage Limit – 100% |
| ... |

*FIG. 3*

MIDDLEWARE FRAMEWORK FOR TELCOMMUNICATIONS SERVICE MESSAGING

TECHNICAL BACKGROUND

The present disclosure generally relates to middleware implementations for messaging in a telecommunication environment.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a computerized method is provided. A service database is queried using a unique device identifier of a device and location information of the device. A combination of services that are stored in association with the unique device identifier and the location information in the service database are identified. A summation instruction that is specific to the combination of services is identified. Dynamic fields within the summation instruction are identified. Values for the dynamic fields are identified by querying a parameter database. A composite allocation for the combination of services is determined based on the values identified for the dynamic fields and the summation instruction. A message identifier is identified. The message identifier, the composite allocation, and the unique device identifier are communicated to a delivery node.

In another aspect, one or more non-transitory computer-readable media storing instructions that when executed via one or more processors perform a computerized method are provided. A unique device identifier of a device and location information of the device is received. A service database is queried using a unique device identifier of a device and location information of the device. A combination of services are identified that are stored in association with the unique device identifier and the location information in the service database. A summation instruction that is specific to the combination of services and the location information is identified. Dynamic fields within the summation instruction are identified. For each of the dynamic fields identified, a corresponding value is retrieved from a parameter database. A composite allocation for the combination of services is determined based on the corresponding values identified for the dynamic fields and the summation instruction. A message identifier is identified. The message identifier, the composite allocation, and the unique device identifier are identified to a delivery node.

In yet another aspect, a system is provided. The system includes a service database, an instruction database, a parameter database, and a middleware node that is in communication with a telecommunications network. The middleware node is configured to receive a usage indicator, a unique device identifier of a device, and location information of the device. The middleware node identified a combination of services that are stored in association with the unique device identifier and the location information in the service database. The middleware node identifies a summation instruction that is specific to the combination of services. The middleware node identifies dynamic fields within the summation instruction. The middleware node identifies values for the dynamic fields by querying a parameter database. The middleware node determines a composite allocation for the combination of services based on the values identified for the dynamic fields and the summation instruction. In some aspects, the middleware node identifies a message identifier. The middleware node communicates the message identifier (when present), the composite allocation, and the unique device identifier to a delivery node.

BRIEF DESCRIPTION OF THE DRAWINGS

Aspects are described in detail below with reference to the attached drawings figures, wherein:

FIG. 3 depicts a table of example message types, in accordance with one or more aspects;

DETAILED DESCRIPTION

Figure 1:
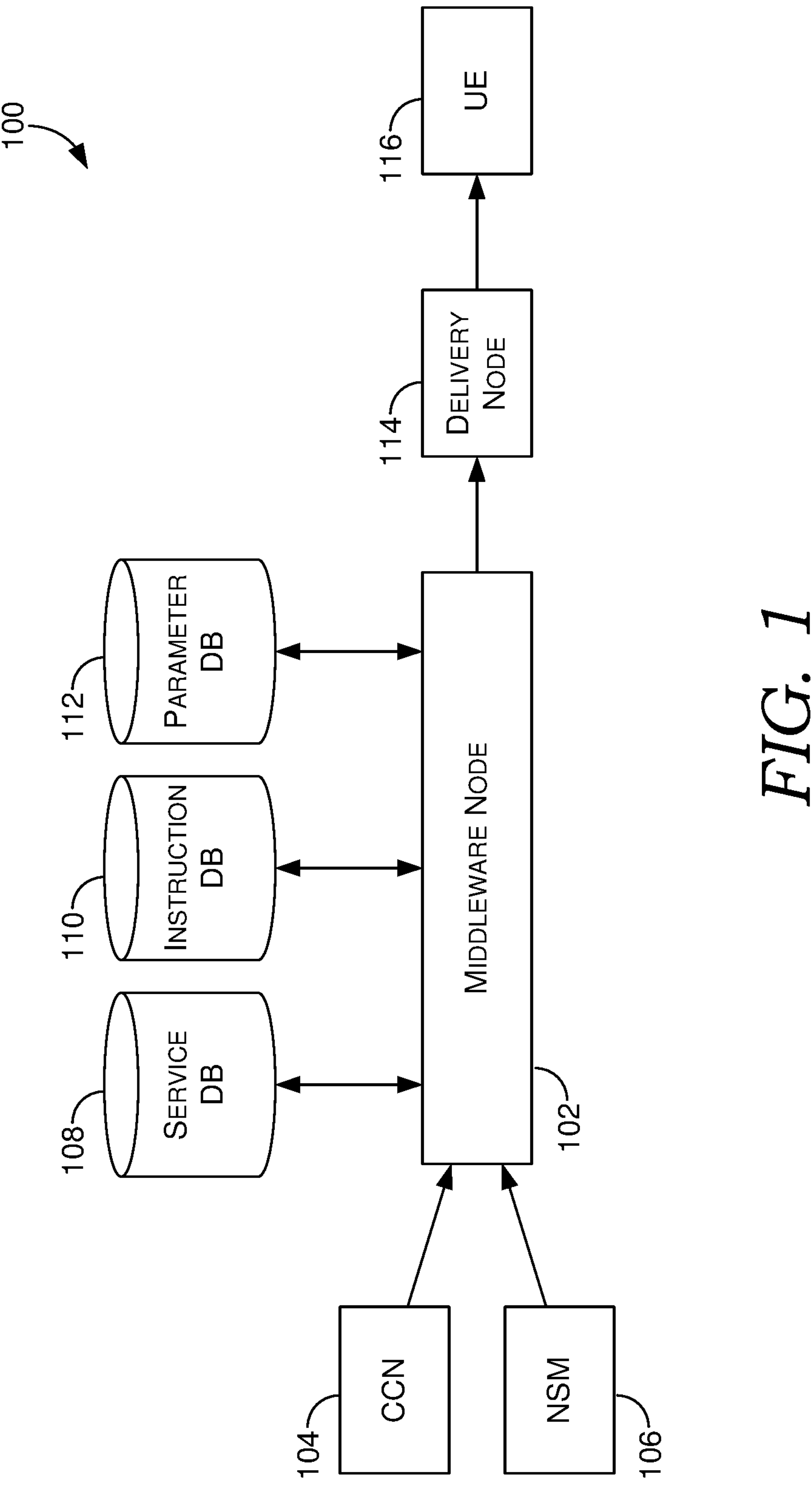
FIG. 1 depicts an example of a system environment, in accordance with one or more aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms “step” and/or “block” may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology

4G Fourth-Generation Wireless Access Technology

5G/5G NR Fifth-Generation Wireless Access Technology/New Radio

5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IoT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mm Wave Millimeter Wave
NEXRAD Next-Generation Radar
NSM Network Services Manager
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 600 shown in FIG. 5. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1XA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macrocell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

OVERVIEW

As discussed hereinafter, methods, media, and systems provide an intelligent middleware for determine accurate allocations for telecommunication services available to the device based on multiple plans, and generating customized messaging for delivery to the devices. For example, when a user device enters the telecommunications network outside of their own country, a middleware node discussed hereinafter determines the scope of services (e.g., data, voice, roaming) that the user device is able to use within the telecommunications network, per the base plan and one or more supplemental plans associated with that user device. The middleware node operates to intelligently identify the particular combination or permutations of a base and various supplement plans for a particular device, and how the device can operate based on the device's location. The middleware node synthesizes various parameters/thresholds across all of the user's base and supplemental plans, as they relate to the user device's location, into composite allocations. The composite allocations are provided to the user device, as accurate and up-to-date.

Other technologies were unable to derive an accurate scope of services in global roaming, for example, as those technologies accessed a base plan separately from a supplemental plan in manner that did not enable integration. In other technologies, multiple messages with conflicting information about the scope of services might be pushed to the user device.

FIG. 1 depicts an example of a system environment 100, in accordance with one or more embodiments. In aspects, the system environment 100 comprises a middleware node 102 that is in communication with and/or operates within a telecommunications network (not shown).

Examples of a middleware node 102 comprises a node that operates between an operating system and various applications that operate outside of, or external to, the operating system. In context, the middleware node 102 may be a specially-configured software that operates as an intermediary between various applications and/or nodes that may operate within or external to the telecommunications system. For example, the middleware node may communicate information bi-directionally (as input and output) between the telecommunication network and one or more application programming interfaces (APIs). In one example, the middleware node 102 may communicate information bi-directionally between a telecommunications network and one or more of a Convergent Charging Node (CCN) 104 or system, a Network Services Manager (NSM) 106 or node, and/or other systems/nodes. In one example, the Convergent Charging Node (CCN) 104 or system receives information from a Network Provider Edge (NPE) node while the NSM 106 receives information from an Mobile Management Entity (MME) node.

The middleware node 102 operates as an intermediary between various applications and/or nodes that may not otherwise be able to communicate with each other, with various operating systems, and/or with the telecommunications network, such that the middleware node 102 "bridges" the communication or translation gap between diverse APIs, for example. In some aspects, the middleware node 102 may utilize a messaging framework for the exchange of information between applications and/or nodes that may not otherwise be able to communicate with each other, with various operating systems, and/or with the telecommunications network. Examples of messaging frameworks include JavaScript Object Notation (JSON), Representational State Transfer (REST API), Extensible Markup Language (XML), Web services, and Simple Object Access Protocol (SOAP).

The middleware node 102 may be hosted by a physical resource (e.g., a physical server), a virtual resource (e.g., cloud computing services), or may be dispersed between physical and virtual resources, in various aspects. Examples of middleware functionally types include database middleware, application server middleware, message-oriented middleware, transaction-processing monitors, and/or web middleware.

The system environment 100 comprises a service database 108, an instruction database 110, and a parameter database 112, in various aspects. The service database 108 stores a plurality of service plans that are organized, arranged, and/or indexed with corresponding unique identifiers that identify a particular device and/or a particular user of the device. Service plans generally refer base services and supplementary plans, as further discussed herein. The instruction database 110 stores a plurality of summation instructions. A summation instruction refers to a computer-executable instruction that specifies which, and how, one or more values for parameters are to be summed, weighted, and/or the like, as further discussed herein. The parameter database 112 stores a plurality of parameters and parameters specific data, such as one or more values that correspond to a parameter. The one or more values may define maximums, minimums, upper limits, lower limits, speeds, quantities, durations, and the like with regard to the base service, the supplementary plan, or both, as they defines a device's connectivity, access, functionalities, and/or communications with respect to a telecommunications network. One or more of the service database 108, the instruction database 110, and/or the parameter database 112 may be stored using a physical resource (e.g., a physical memory), a virtual resource (e.g., cloud-based storage), or any combination thereof, in various aspects.

The system environment 100 comprises a delivery node 114, in some aspects. The delivery node 114 communicates with one or more devices, such as user device 116. In one example, the delivery node 114 may be a Delivery Notification Node (DND).

Having described the system environment 100 and components thereof, it will be understood by those of ordinary skill in the art that the system environment 100 is but one example of a suitable system and is not intended to limit the scope of use or functionality of the present invention. Similarly, the system environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1 may be utilized in implementations of the present invention. It will be understood to those of ordinary skill in the art that the components may be connected in various manners, hardwired or wireless, and may use intermediary components that have been omitted or not included in FIG. 1 for simplicity. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 2:
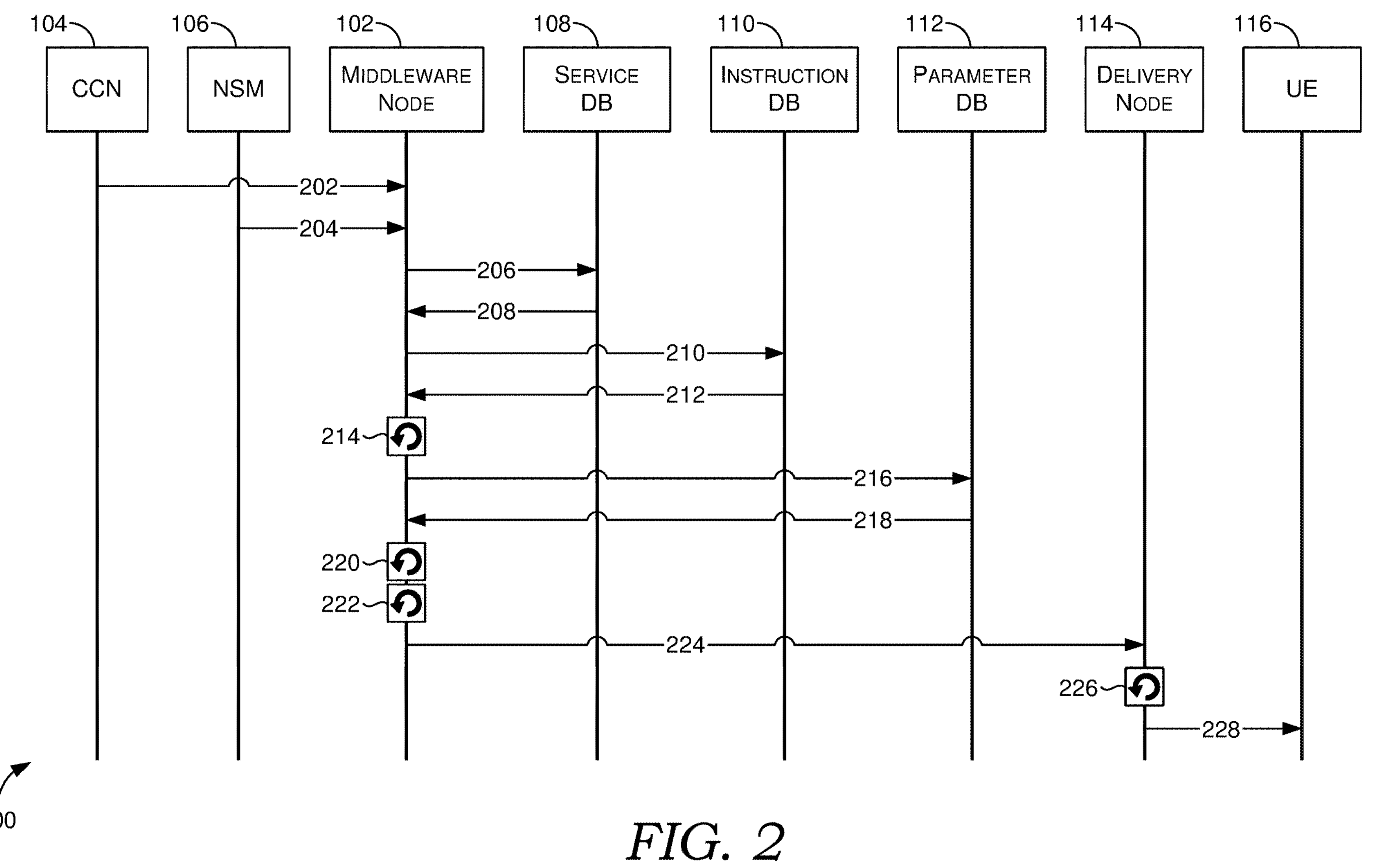
FIG. 2 depicts an interaction diagram between various components of the system of FIG. 1, in accordance with one or more aspects.

Moving to FIG. 2, a interactions diagram 200 depicts communications and interactions between one or more components of the system environment 100 of FIG. 1, in accordance with one or more aspects. In aspects, the middleware node 102 receives a usage indicator, a unique device identifier of a device, location information of the device, or any combination thereof. In some examples, the Convergent Charging Node (CCN) 104 communicates 202 a usage indicator and/or a unique device identifier of a device to the middleware node 102. In some examples, the NSM 106 communicates 204 location data and/or a unique device identifier of a device to the middleware node 102. In other examples, one or more of the usage indicator, the unique device identifier of a device, and/or location information of the device may be received from other components (now shown).

The usage indicator may be, for example, an electronic message received over the telecommunication network that indicates the device is within range of the telecommunication network, seeks to connect to the telecommunication network, and/or has connected to the telecommunication network from the device's current location. The unique device identifier may be, for example, a telephone number for the device, an International Mobile Equipment Identity (IMEI), a Subscriber Identify Module (SIM) card identifier, an eSIM identifier, iSIM identifier, an International Mobile Subscriber Identity (IMSI), a Service Set Identifier (SSAID), a Universally Unique Identifier (UUID), a Mobile Subscriber International Subscriber Directory Number (MSISDN), or the like. The location information may comprise, for example, real-time, near-real time, current, and/or the most recently obtained details of the geographic location of the physical device. The location information may be described using any of and/or any combination of GPS coordinates, a Mobile Country Code (MCC), a Mobile Network Code (MNC), and the like, for example.

The middleware node 102 queries 206 the service database 108 using a unique device identifier of the device and the location information of the device. In this manner, the middleware node 102 is able to retrieve, obtain, and/or identify 208 the particular combination of services that are stored in association with the unique device identifier, and further, the particular combination of services relative to the location information.

The middleware node 102 queries 210 the instruction database 110 for an entry that corresponds to, is associated with, and/or matches the combination of services and the location information. In aspects, the combination of services comprises a base service and a supplemental service. A base service may be a voice, data, roaming, and/or location service plan that exists between a telecommunications service provider and a user, wherein the voice, data, and location service plan defines how the user's connectivity to the telecommunications network is managed. A supplemental service may be a secondary voice, data, roaming, and/or location service plan that exists between a telecommunications service provider and a user, and which is active in addition to the base service. The secondary voice, data, roaming, and/or location service plan may define how the user's connectivity to the telecommunications network is managed with regard to additional services, such as increased data usage, increased download/upload speeds, increased coverages area, and the like. In this manner, the middleware node 102 is able to identify 212 a summation instruction that is specific to the combination of services in the instruction database 110, by searching for an entry in the instruction database 110 that corresponds to, is associated with, and/or matches the combination of services and the location information of the query. Although shown in sequence, this is merely an example. The middleware node 102 may query the service database 108 and the instruction database 110 concurrently, simultaneously, or in any sequence relative to each other.

The middleware node 102 identifies 214 one or more dynamic fields within the summation instruction identified. The middleware node 102 may analyze the summation instruction to determine and/or identify one or more parameter identifiers within the dynamic fields of the summation instruction. A dynamic field refers to a data field into which a parameter can be or has been inserted, and as such modifying the parameter identifier in the field allows for the data field to be dynamically modified. A parameter identifier uniquely may be an alphanumeric string or hash, in various aspects, that identifies a particular parameter as distinguishable from another, and for which a value may be specified.

At 216, the middleware node 102 queries 216 the parameter database 112 using the parameter identifier(s) of a dynamic field, to locate a particular parameter and a corresponding value for that particular parameter. The terms "parameter" and "parameter threshold" may be used interchangeably herein for simplicity. Examples of parameters include a daily total data allotment threshold, a weekly total data allotment threshold, a monthly total data allotment threshold, a daily data usage threshold, a data download speed/rate, an upload rate speed/rate, a data download speed/rate that is dependent on the current data allotment or data usage, a usage counter, a usage counter upper limit, a usage counter lower limit, and the like. The querying may be repeated until each parameter identifier that is present in one or more of the dynamic fields is located within the parameter database 112. In this manner, the middleware node 102 is able to retrieve, obtain, and/or identify 218 a value that is specific to the parameter identifier from the parameter database, for a dynamic field. Accordingly, the middleware node 102 retrieve, obtain, and/or identify a particular value for each parameter identifier in one or more of the dynamic fields. Each parameter may be associated with a particular value, in aspects. Further, in some aspects, each particular value may be associated with a code number that uniquely identifies that particular value. Each parameter may be associated with a particular status type and/or status subtype, in aspects, as well as a particular code and/or code for that value. These queries may be performed, sequentially, in one or more batches, concurrently, or simultaneously, for example. In some aspects, the middleware node 102 retrieves additionally information with a value, such as a usage type, a usage subtype, and/or a status type that correspond to the parameter and its value(s).

In an example, the middleware node 102 queries the parameter database 112 using the parameter identifier(s) "10085" from one of the dynamic fields to locate a particular upper threshold for a usage counter, a corresponding value of "10485760" for that particular parameter, and a usage threshold status of "alert1." This indicates, generally, that when the upper threshold for the usage counter is met or exceeded by the device, an alert should be provided to the device. In an example, the middleware node 102 queries the parameter database 112 using the parameter identifier(s) "10074" from one of the dynamic fields to locate another particular upper threshold for a usage counter, a corresponding value of "100 GB" for that particular parameter, and a usage threshold status of "throttle." This indicates that when the usage counter reaches or exceeds the upper threshold, the device should be instructed and connected in a manner where data is throttled, e.g., slowed, over the telecommunications network. As such examples, the particular upper threshold for a usage counter may include multiple values; one value for when throttling should be implemented based on the usage counter, and another value the specifies the throttling rate to be utilized when the threshold is met or exceeded. The process may be repeated until all of the dynamic fields are accounted for, and a parameter/value has been retrieved for the parameter identifier. As such, a summation instruction may include one dynamic field, multiple dynamic fields, one parameter identifier, multiple parameter identifiers, repeating parameter identifiers, etc. A parameter identifier may be unique to a specific service and/or may be unique to a specific combination services.

Continuing, the middleware node 102 determines 220 a composite allocation for the combination of services based on the values identified for the dynamic fields and the summation instruction. Each value is specific to a particular parameter to which the parameter identifier corresponds, and the value is associated with the parameter as defined under the base service and/or the supplemental service. As such, the value may be used to define the parameter with regard to the terms of the base service or the supplemental service, such that the value may define maximums, minimums, upper limits, lower limits, speeds, quantities, durations, and the like with regard to the base service, the supplementary plan, or both, to define a device's connectivity, access, functionalities, and/or communications with respect to a telecommunications network.

The middleware node 102 determines the composite allocation based on the values obtained for the dynamic fields in the summation instruction, which is specific to the combination of services and/or the location information received by the middleware node 102. For example, the middleware node 102 inserts the values retrieved for the parameter identifiers into the corresponding dynamic fields from which the parameter identifiers, used to retrieve said values, were obtained. The middleware node 102 may then execute the summation instruction using the values, as inserted, to calculate the composite allocation. The summation instruction may instruct the middleware node 102 to combine and sum a value for a data usage parameter of a base service with a value for a data usage parameter of a supplementary plan, for example. The summation instruction may the middleware node 102 to combine and sum values from each plan that correspond to the same parameter, that correspond to similar or related parameters, and/or that correspond to different parapets. The summation instruction may provide for determining a composite allocation for one or more parameters, for example. Additionally or alternatively, the summation instruction may provide for determining a composite allocation for each of a plurality of parameters. In this manner, the summation instruction can be executed by the middleware node 102 to determine a combined value, an overall value or a total value for each particular parameter (whether one or a plurality), to reflect the combination of the services of the base service with the services of the supplementary plan for the device.

The composite allocation indicates parameters for the base service as combined with the supplemental service. For example, the composite allocation may specify a total data usage amount that is allowed for the device based on the total data usage amount allowed under the base service as combined with the total data usage amount of the supplemental service, where the composite allocation further accounts for the specific location of the device (e.g., domestic, international). As such, the value(s) for a first parameter as specific and defined for the base service may be combined or summed with the value(s) for the first parameter as specific and defined for the supplemental service, in one simplified example. In this manner, the middleware node 102 may determine and/or calculate a plurality of composite allocations, each for various parameters, based on the summation instruction(s) and value(s) obtained. For example, the middleware node 102 may calculate a composite allocation for a parameter of data allotment using values retrieved based on the parameter identifiers, wherein those values define total thresholds for the base and supplemental plans of the device, and wherein the composite allocation defines the overall total threshold of the parameter of data allotment for the combination of the base and supplemental services of the device. Additionally or alternatively, the middleware node 102 may calculate a composite allocation for a parameter of daily data usage using values retrieved based on the parameter identifiers, wherein those values define total thresholds for the base and supplemental services of the device, and wherein the composite allocation defines the overall total threshold of the parameter of daily data usage for the combination of the base and supplemental services of the device.

In some aspects, the middleware node 102 identifies 222 a message identifier. In other aspects, the delivery node 114 may identify a message identifier based on data received from the middleware node 102 as further discussed below. The message identifier may uniquely identify a particular message type and/or a specific message that is, for example: associated with the parameter and/or the parameter identifier to which the composite allocation corresponds; associated with a type and/or subtype of the parameter and/or the parameter identifier; associated with a type and/or subtype of the parameter; associated with the combination of parameters and/or the parameter identifiers to which the composite allocations correspond; associated with the summation instruction; the location information; and any combination thereof.

The middleware node 102 communicates 224 the message identifier (when present), the composite allocation, the unique device identifier, the location information, or any combination thereof, to a delivery node 114. In another example, the middleware node communicates the composite allocation and the unique device identifier to a delivery node 114, wherein the delivery node 114 may identify a message identifier and/or message from the information received.

In aspects, the delivery node is configured to customize 226 the message that corresponds to the message identifier using at least the composite allocation. For example, the delivery node 114 may retrieve a message template of the message identifier and customize the message by inserting the composite allocation(s) into one or more specific field(s) within the message. The delivery node 114 may communicate 228 the customized message to the user device 116 that corresponds to the unique device identifier. Examples of message types are shown in the table 300 of FIG. 3.

The interactions shown in FIG. 2 may be repeated periodically and/or intermittently to "welcome" a device upon connecting to the telecommunications network, to alert the user when one or more data usage or data allotment thresholds (e.g., 50% of total data allotment for the combined plans; 80% of total data allotment for the combined plans; 100% of total data allotment for the combined plans is used) of the combined plans are met and/or exceeded, to alert the user when one or more voice data thresholds of the combined plans are met and/or exceeded, to alert the user when one or more roaming thresholds of the combined plans are met and/or exceeded; to alert the user when service(s) may be throttled, and/or the like.

For example, when a subsequent usage indicator of the device and updated location information of the device are received, the middleware node 102 may identify another summation instruction that is specific to the combination of services and updated location information of the device. The middleware node 102 may identify dynamic fields within the other summation instruction and values for the dynamic fields by querying the parameter database, in such an aspect. The middleware node 102 may determine another (for the same or another parameter) composite allocation for the combination of services based on the values identified for the dynamic fields and the other summation instruction. The middleware node 102 may identify and communicate another message identifier (optionally), as well as the other composite allocation, and the unique device identifier, to the delivery node.

Figure 4:
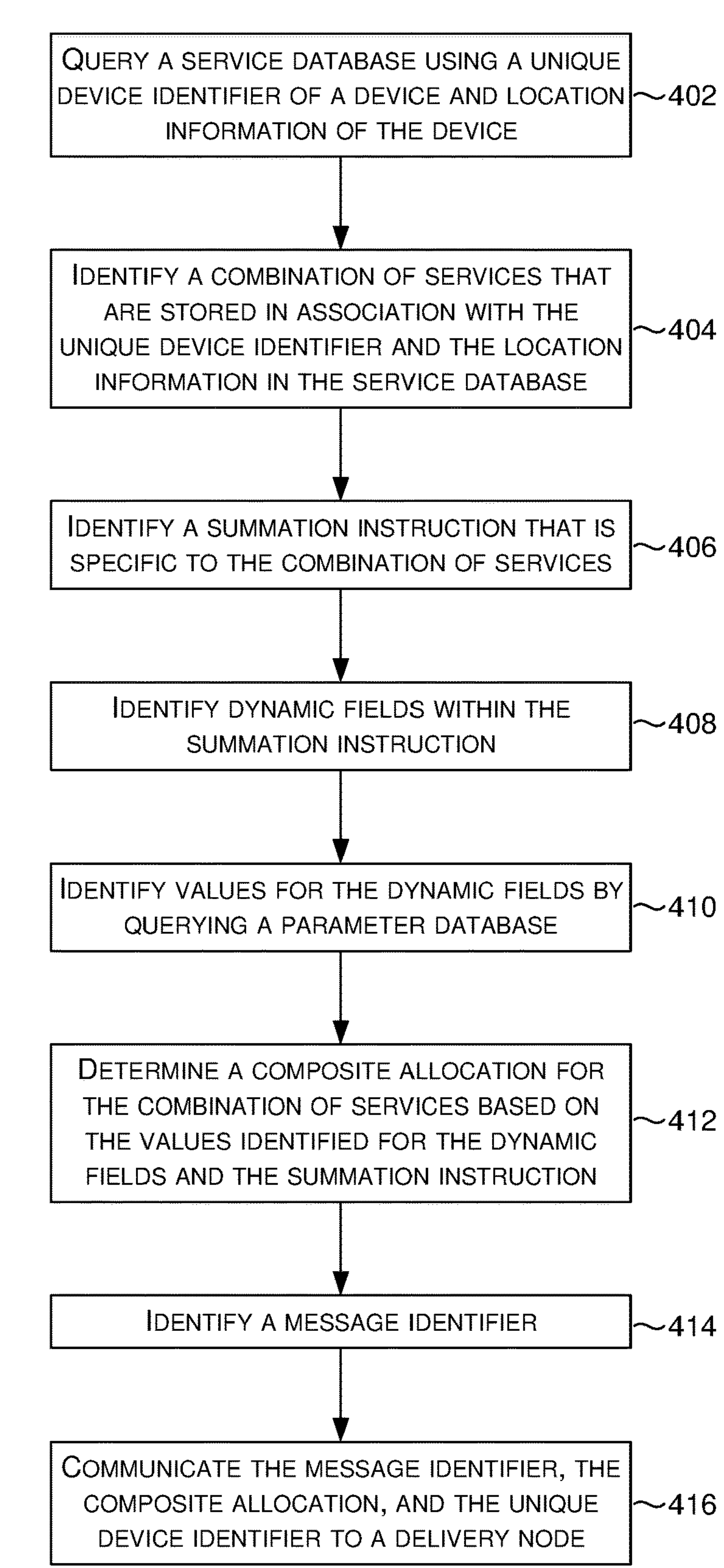
FIG. 4 depicts a flowchart of an example method, in accordance with one or more aspects.

FIG. 4 depicts a flowchart of an example method 400, in accordance with one or more aspects. In some embodiments, the method 400 can be a computer-implemented method. In one embodiment, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of software and/or hardware for performing one or more of the steps of the method 400, in embodiments. As discussed below, the method 400 can be performed using software, hardware, component(s), and/or device(s) depicted in the example of FIG. 1.

At block 402, a service database is queried using a unique device identifier of a device and location information of the device. The middleware node 102 of FIG. 1, for example, may query the service database using the unique device identifier and the location information of the device. At block 404, a combination of services is identified that are stored in association with the unique device identifier and the location information in the service database. The middleware node 102 of FIG. 1, for example, may identify a combination of services that are stored in association with the unique device identifier and the location information in the service database. At block 406, a summation instruction is identified that is specific to the combination of services. The middleware node 102 of FIG. 1, for example, may identify the summation instruction that is specific to the combination of services. Identification of the summation instruction that is specific to the combination of services may include querying an instruction database for an entry that matches the combination of services and the location information, in aspects. In aspects, the combination of services comprises a base service and a supplemental service. In further aspects, the combination of services comprises a base service and a plurality of supplemental services.

At block 408, dynamic fields are identified within the summation instruction. The middleware node 102 of FIG. 1, for example, may identify the dynamic fields. Identification of the dynamic fields within the summation instruction may include identifying parameter identifiers within the dynamic fields of the summation instruction in the instruction database. At block 410 values for the dynamic fields are identified by querying a parameter database.

Identification of the values for the dynamic fields may include, for each parameter identifier identified in the summation instruction, querying a parameter database for the parameter identifier, in aspects. Additionally, identification of the values for the dynamic fields may include, for each parameter identifier identified in the summation instruction, retrieving a value that is specific to the parameter identifier from the parameter database. The value retrieved is specific to a parameter to which the parameter identifier corresponds. Thus, the parameter identifier can be matched to an entry for the parameter and/or parameter identifier in the parameter database, which stores one or more values to define the parameter and/or parameter identifier, in various aspects. The value may be associated with the base service and/or the supplemental service, in aspects. In one example, the value may be associated with either the base service or the supplemental service, but not both. In another example, the value is specific to a parameter to which the parameter identifier corresponds, and the value is associated with the base service and/or the supplemental service.

At block 412, a composite allocation is determined for the combination of services based on the values identified for the dynamic fields and the summation instruction. The middleware node 102 of FIG. 1, for example, may determine one or more composite allocations for one or more parameters of the base and supplemental services. For example, as discussed above, middleware node 102 may then execute the summation instruction using the values, as inserted, to calculate the composite allocation. The summation instruction may instruct the middleware node 102 to sum a value for a data usage parameter of a base service with a value for a data usage parameter of a supplementary plan, for example. In another example, the middleware node 102 may calculate a composite allocation for a parameter of data allotment using values retrieved based on the parameter identifiers, wherein those values define total thresholds for the base and supplemental services of the device, and wherein the composite allocation defines the overall total threshold of the parameter of data allotment for the combination of the base and supplemental services of the device. In this manner, for each parameter or parameter identifier, a corresponding threshold from the base service can be summed with a corresponding threshold of one or more supplementary plans, as matches the combination of plans of the device.

At block 414, a message identifier is identified. The middleware node 102 of FIG. 1, for example, may identify a message identifier, as previously discussed. Alternatively, the message identifier may be identified by the delivery node 114, for example, of FIG. 1. The message may be associated with one or more data type (e.g., data, voice, roaming). Additionally, the message may associated with a message subtype (e.g., notify, alert, active, throttle, active, overage, active capped or throttle).

At block 416, the message identifier (when present), the composite allocation, and the unique device identifier to a delivery node are communicated. The middleware node 102 of FIG. 1, for example, may communicate the message identifier, the composite allocation, and the unique device identifier to the delivery node 114 of FIG. 1.

In further aspects, the middleware node may determine a current data usage of the device. In some aspects, the middleware node may communicate the current data usage of the device with the message identifier, the composite allocation, and the unique device identifier to the delivery node. Communicating the message identifier, the composite allocation, and/or the unique device identifier to the delivery node may the delivery node to implement additional actions. For example, the delivery node may populate a message that corresponds to the message identifier with the composite allocation, and further, may communicate the message as populated to the device that corresponds to the unique device identifier.

Figure 5:
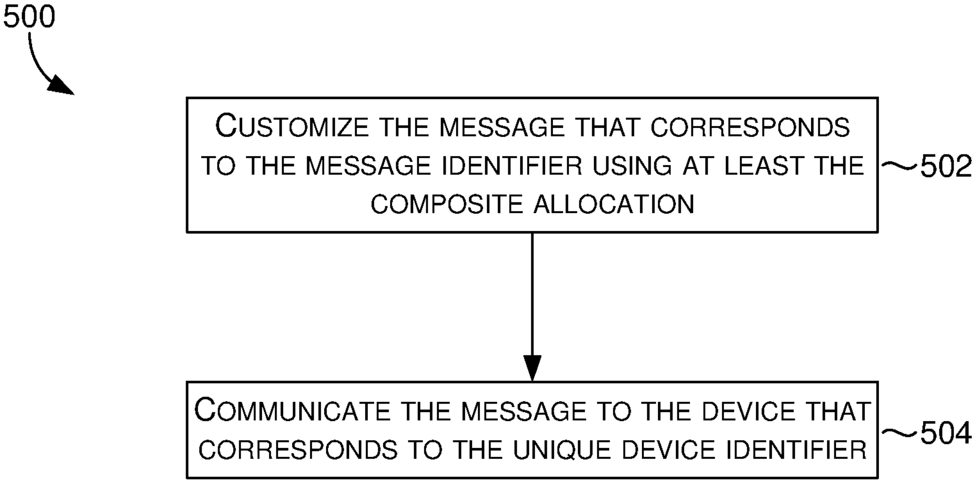
FIG. 5 depicts a flowchart of an example method, in accordance with one or more aspects.

FIG. 5 depicts a flowchart of an example method 500, in accordance with one or more aspects. In some embodiments, the method 500 can be a computer-implemented method. In one embodiment, one or more non-transitory computer-readable storage media having computer-readable instructions or computer-readable program code portions embodied thereon, for execution via one or more processors, can be used to implement and/or perform the method 500. For example, computer-readable instructions or computer-readable program code portions can specify the performance of the method 500, can specify a sequence of steps of the method 500, and/or can identify particular component(s) of software and/or hardware for performing one or more of the steps of the method 500, in embodiments. As discussed below, the method 500 can be performed using software, hardware, component(s), and/or device(s) depicted in the example of FIG. 1.

At block 502, a message that corresponds to the message identifier is customized using at least the composite allocation. For example, the message can be customized by populating a message that corresponds to the message identifier with the composite allocation. The delivery node 114 of FIG. 1 may customize such a message, for example. At block 504, the message, as populated, is communicated to the device that corresponds to the unique device identifier. The delivery node 114 of FIG. 1 may communicate the message, for example, to the user device 116.

Figure 6:
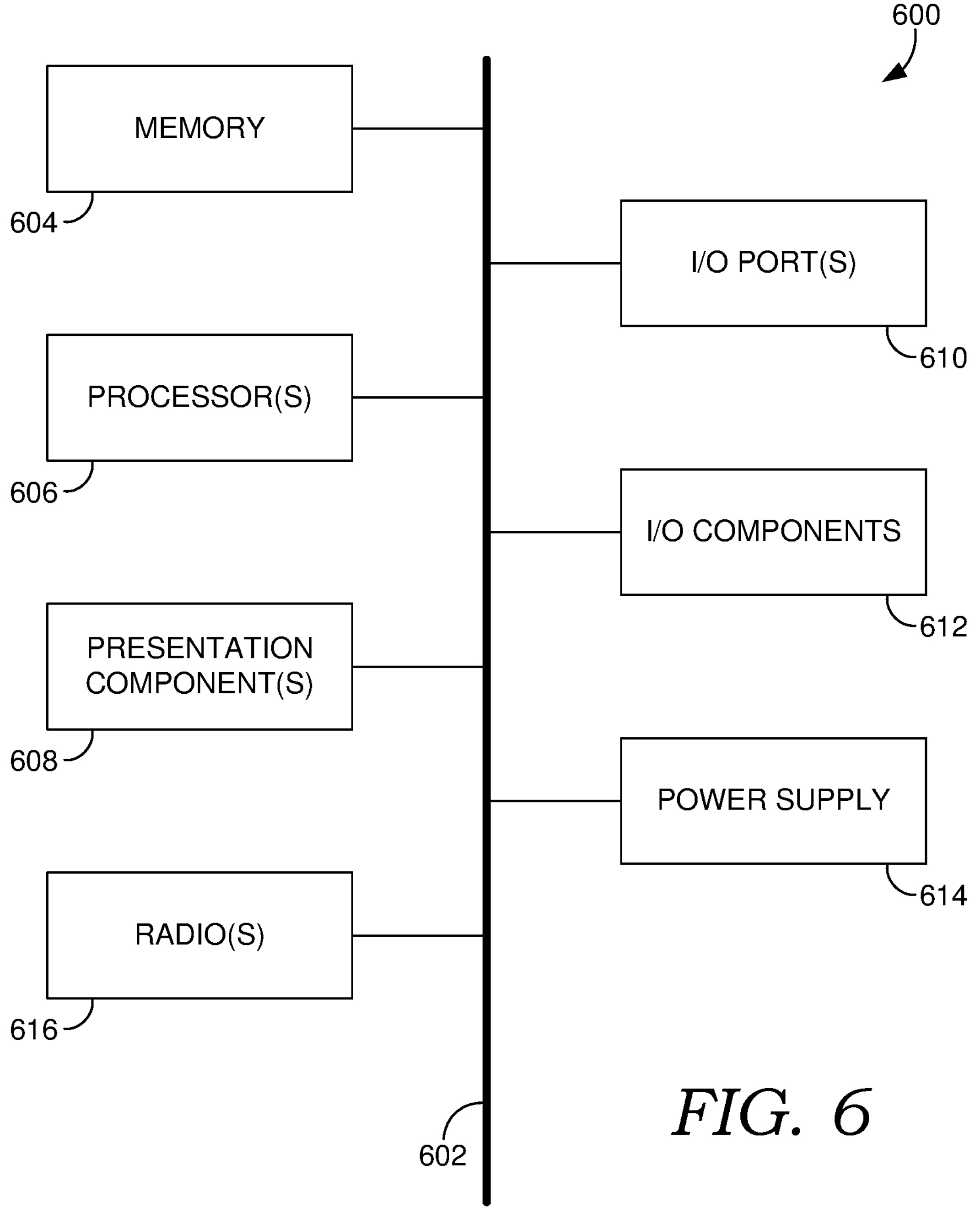
FIG. 6 is an example device suitable for use in implementations of the disclosure.

FIG. 6 illustrates an example device suitable for use in implementations of the disclosure. Computing device 600 is but one example of a suitable computing environment and is not intended to suggest any limitation as to the scope of use or functionality of the invention, and nor should computing device 600 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples with the following devices: memory 604, one or more processors 606, one or more presentation components 608, input/output (I/O) ports 610, I/O components 612, and power supply 614. Bus 602 represents what may be one or more buses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer storage media in the form of volatile and/or non-volatile memory. Memory 604 may be removable, non-removable, or a combination thereof. Examples of memory include solid-state memory, hard drives, optical disc drives, etc. Computing device 600 includes one or more processors 606, which read data from various entities such as bus 602, memory 604, or I/O components 612. One or more presentation components 608 present data indications to a person or other device. Examples of one or more presentation components 608 include a display device, speaker, printing component, vibrating component, etc. The I/O ports 610 allow computing device 600 to be logically coupled to other devices including I/O components 612, some of which may be built into computing device 600. The example I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VOIP communications. As can be appreciated, in various aspects the radio 616 can be configured to support multiple technologies, and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:

querying a service database using a unique device identifier of a device and location information of the device;

identifying a combination of services that are stored in association with the unique device identifier and the location information in the service database;

identifying a summation instruction that is specific to the combination of services;

identifying dynamic fields within the summation instruction;

identifying values for the dynamic fields by querying a parameter database; determining a composite allocation for the combination of services based on the values identified for the dynamic fields and the summation instruction; identifying a message identifier; and communicating the message identifier, the composite allocation, and the unique device identifier to a delivery node, wherein the delivery node retrieves a message template of the message identifier and customizes the message template by inserting the composite allocation into the dynamic fields and communicates a customized message to the device associated with the unique device identifier.

2. The method of claim 1, wherein communicating the message identifier, the composite allocation, and the unique device identifier to the delivery node causes the delivery node to:

populate a message that corresponds to the message identifier with the composite allocation; and communicate the message as populated to the device that corresponds to the unique device identifier.

3. The method of claim 1, wherein identifying the summation instruction that is specific to the combination of services comprises querying an instruction database for an entry that matches the combination of services and the location information, wherein the combination of services comprises a base service and a supplemental service.

4. The method of claim 3, wherein identifying the dynamic fields within the summation instruction comprises: identifying parameter identifiers within the dynamic fields of the summation instruction stored in the instruction database.

5. The method of claim 4, wherein identifying the values for the dynamic fields by querying the parameter database comprises: for each parameter identifier identified in the summation instruction: querying the parameter database for the parameter identifier; and retrieving a value that is specific to the parameter identifier from the parameter database, wherein the value is specific to a parameter to which the parameter identifier corresponds, and wherein the value is associated with the base service or the supplemental service.

6. The method of claim 5, wherein determining the composite allocation for the combination of services based on the values identified for the dynamic fields and the summation instruction comprises:

inserting the values retrieved for the parameter identifiers into the corresponding dynamic fields of the summation instruction that is specific to the combination of services; and executing the summation instruction using the values inserted to calculate the composite allocation, wherein the composite allocation indicates a parameter threshold of the base service combined with a parameter threshold of the supplemental service.

7. The method of claim 1, further comprising:

determining a current data usage of the device; and communicating the current data usage of the device with the message identifier, the composite allocation, and the unique device identifier to the delivery node.

8. The method of claim 1, wherein the composite allocation comprises a total data usage amount that is allowed for the device based on a base service combined with a supplemental service.

9. One or more non-transitory computer-readable media storing instructions that when executed via one or more processors perform a computerized method, the instructions stored on the non-transitory computer-readable media comprising:

receiving a unique device identifier of a device and location information of the device;

querying a service database using the unique device identifier of the device and the location information of the device; identifying a combination of services that are stored in association with the unique device identifier and the location information in the service database; identifying a summation instruction that is specific to the combination of services and the location information; identifying dynamic fields within the summation instruction;

for each of the dynamic fields identified, retrieving a corresponding value from a parameter database; determining a composite allocation for the combination of services based on the corresponding values identified for the dynamic fields and the summation instruction; identifying a message identifier; and communicating the message identifier, the composite allocation, and the unique device identifier to a delivery node, wherein the delivery node retrieves a message template of the message identifier and customizes the message template by inserting the composite allocation into the dynamic fields and communicates a customized message to the device associated with the unique device identifier.

10. The media of claim 9, wherein communicating the message identifier, the composite allocation, and the unique device identifier to the delivery node causes the delivery node to:

populate a message that corresponds to the message identifier with the composite allocation; and communicate the message as populated to the device that corresponds to the unique device identifier.

11. The media of claim 9, wherein identifying the summation instruction that is specific to the combination of services comprises querying an instruction database for an entry that matches the combination of services and the location information, wherein the combination of services comprises a base service and a supplemental service.

12. The media of claim 11, wherein identifying the dynamic fields within the summation instruction comprises:

identifying parameter identifiers within the summation instruction stored in the instruction database.

13. The media of claim 12, wherein identifying the values for the dynamic fields by querying the parameter database comprises:

for each of the parameter identifiers in the summation instruction:

querying the parameter database for the parameter identifier; and retrieving a value that is specific to the parameter identifier from the parameter database, wherein the value is specific to a parameter to which the parameter identifier corresponds, and wherein the value is associated with the base service or the supplemental service.

14. The media of claim 13, wherein determining the composite allocation for the combination of services based on the values identified for the dynamic fields and the summation instruction comprises:

inserting the values retrieved for the parameter identifiers into the corresponding dynamic fields of the summation instruction that is specific to the combination of services; and executing the summation instruction using the values inserted to calculate the composite allocation, wherein the composite allocation indicates a parameter threshold of the base service combined with a parameter threshold of the supplemental service.

15. The media of claim 9, further comprising:

determining a current data usage of the device; and communicating the current data usage of the device with the message identifier, the composite allocation, and the unique device identifier to the delivery node.

16. The media of claim 9, wherein the composite allocation comprises a total data usage amount that is allowed for the device based on a base service combined with a supplemental service.

17. A system comprising: a service database;

an instruction database;

a parameter database; and a middleware node that is in communication with a telecommunications network, the middleware node configured to:

receive a usage indicator, a unique device identifier of a device, and location information of the device;

identifying a combination of services that are stored in association with the unique device identifier and the location information in the service database;

identifying a summation instruction that is specific to the combination of services;

identifying dynamic fields within the summation instruction;

identifying values for the dynamic fields by querying the parameter database;

determining a composite allocation for the combination of services based on the values identified for the dynamic fields and the summation instruction;

identifying a message identifier; and communicating the message identifier, the composite allocation, and the unique device identifier to a delivery node, wherein the delivery node retrieves a message template of the message identifier and customizes the message template by inserting the composite allocation into the dynamic fields and communicates a customized message to the device associated with the unique device identifier.

18. The system of claim 17, further comprising:

the delivery node configured to:

customize a message that corresponds to the message identifier using at least the composite allocation; and communicate the message to the device that corresponds to the unique device identifier.

19. The system of claim 17, wherein a usage indicator is received from a Convergent Charging Node (CCN), and wherein the location information is received from a Network Services Manager (NSM).

20. The system of claim 17, the middleware node further configured to: when a subsequent usage indicator of the device and updated location information of the device are received:

identifying another summation instruction that is specific to the combination of services and the updated location information of the device;

identifying dynamic fields within the another summation instruction;

identifying values for the dynamic fields within the another summation instruction by querying the parameter database;

determining another composite allocation for the combination of services based on the values identified for the dynamic fields within the another summation instruction and the another summation instruction;

identifying another message identifier; and communicating the another message identifier, the another composite allocation, and the unique device identifier to the delivery node.

* * * * *